(12) United States Patent
Ehlers et al.

(10) Patent No.: US 9,180,970 B2
(45) Date of Patent: Nov. 10, 2015

(54) DOUBLE CABIN ATTENDANT SEAT (71) Applicant: Airbus Operations GmbH, Hamburg (DE)

(72) Inventors: Bernd Ehlers, Hamburg (DE); Mark Herzog, Hamburg (DE); Stefan Behrens, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 14/258,580

(22) Filed: Apr. 22, 2014

(65) Prior Publication Data
US 2014/0312173 A1 Oct. 23, 2014

(30) Foreign Application Priority Data
Apr. 23, 2013 (EP) .................................... 13164941

(51) Int. Cl.
B64D 11/06 (2006.01)
B60N 2/30 (2006.01)

(52) U.S. Cl.
CPC .............. B64D 11/06 (2013.01); B60N 2/3018 (2013.01); B60N 2/3025 (2013.01); B60N 2/3047 (2013.01); B64D 11/0691 (2013.01)

(58) Field of Classification Search
CPC .............. B64D 11/06; B64D 11/0639; B64D 11/0689; B64D 11/0691; B64D 11/0698
See application file for complete search history.

(56) References Cited

U.S. PATENT DOCUMENTS

| 4,740,030 | A | * | 4/1988 | Nordskog ....................... 297/13 |
| 4,799,632 | A |   | 1/1989 | Baymak et al. |
| 4,832,404 | A | * | 5/1989 | Baymak et al. ............... 297/333 |
| 4,993,666 | A |   | 2/1991 | Baymak et al. |
| 2009/0206200 | A1 | | 8/2009 | Bolder et al. |
| 2012/0199695 | A1 | * | 8/2012 | Isherwood et al. ......... 244/118.6 |
| 2014/0166808 | A1 | * | 6/2014 | Boenning et al. .......... 244/118.6 |

FOREIGN PATENT DOCUMENTS

| DE | 3634839 | 4/1988 |
| DE | 3790556 | 10/1996 |
| DE | 102008009938 | 3/2009 |
| DE | 102011116521 | 4/2013 |
| DE | 102012014619 | 1/2014 |
| WO | 8801589 | 3/1988 |

OTHER PUBLICATIONS

European Search Report, Nov. 25, 2013.

* cited by examiner

Primary Examiner — Tien Dinh
Assistant Examiner — Richard R Green
(74) Attorney, Agent, or Firm — Greer, Burns & Crain Ltd.

(57) ABSTRACT

A cabin attendant seat for an aircraft, an aircraft monument comprising such a cabin attendant seat and an aircraft comprising such an aircraft monument. The cabin attendant seat is movable from a starting position into at least one end position. The cabin attendant seat includes at least one backrest element and two seat elements. Each of the two seat elements is movable relative to the at least one backrest element between a folded position and an unfolded position.

11 Claims, 6 Drawing Sheets

Fig. 2c — Forward Seat

Fig. 2d — Aft Seat

DOUBLE CABIN ATTENDANT SEAT

CROSS-REFERENCES TO RELATED APPLICATIONS

This application claims the benefit of the European patent application No. 13 164 941.0 filed on Apr. 23, 2013, the entire disclosures of which are incorporated herein by way of reference.

BACKGROUND OF THE INVENTION

The present disclosure relates to a cabin attendant seat for an aircraft, an aircraft monument comprising such a cabin attendant seat and an aircraft comprising such an aircraft monument.

The passenger cabin of a modern aircraft typically is equipped with cabin attendant seats. Such cabin attendant seats are used by the cabin personnel, for example, during takeoff and landing of the aircraft. A conventional cabin attendant seat, as described, for example, in DE 10 2008 009 938 A1, comprises a carrier element which is subdivided into a base element and a backrest element, and a seat element which is fastened to the carrier element and which is constructed as a folding seat element. When the cabin attendant seat is not in use, the seat element is located in a space-saving manner in a folded-up position, that is to say, a seat face of the seat element faces towards a front side of the backrest element of the carrier element. The cabin attendant seat is connected to the aircraft cabin floor by means of the base element of the carrier element. Further to these single cabin attendant seats providing seating for one cabin attendant, double cabin attendant seats are known as disclosed, e.g., in DE 36 34 839 A1. Such double cabin attendant seats may be occupied by two cabin attendants in a side by side or back to back alignment. Such double cabin attendant seats are fixedly mounted to an aircraft monument and the floor of the aircraft.

A further cabin attendant seat is known from DE 3 790 556 C1. The cabin attendant seat comprises not only a seat element which is foldable relative to a carrier element, but also a rotatable backrest element. When these seats are not in use, the backrest element is in such a position that a seat element and a front side of the backrest element face away from the inner space of the passenger cabin. In an operating position of the cabin attendant seat, however, the seat element and the front side of the backrest element are accessible from the inner space of the passenger cabin so that a cabin attendant can be seated on the seat element.

Non-published DE 10 2011 116 521 discloses a cabin attendant seat which is pivotably mounted to an aircraft monument, such that the cabin attendant seat can be pivoted relative to the aircraft monument from a rest position into an operating position. Such cabin attendant seats may also be referred to as swivel cabin attendant seats or swivel-type cabin attendant seats.

Cabin attendant seats may either be mounted to a wall of a monument installed in the aircraft passenger cabin as described in non-published DE 10 2011 116 521 or be attached to the floor of the aircraft passenger cabin as known from DE 10 2008 009 938 A1 (US 2009/0206200 A1).

Further, non-published DE 10 2012 014 619 describes a so-called sliding cabin attendant seat (which may also be referred to as sliding-type cabin attendant seat). The sliding cabin attendant seat as described in DE 10 2012 014 619 comprises a backrest element, a seat element and a guiding apparatus for supporting the flight attendant seat in a starting position. The guiding apparatus is further configured such that the cabin attendant seat is moveable from the starting position into a direction transverse to the longitudinal axis of the backrest element in at least one end position.

Both the swivel and sliding cabin attendant seats can be brought from a start position (rest position) into an end position (operating position). The swivel-type cabin attendant seats are typically either mounted to the floor or to an aircraft monument.

There is a need to provide a cabin attendant seat, an aircraft monument having such a cabin attendant seat and an aircraft having such an aircraft monument providing space efficient seating.

SUMMARY OF THE INVENTION

According to a first aspect, a cabin attendant seat for an aircraft is provided. The cabin attendant seat is moveable from a starting position into at least one end position. The cabin attendant seat comprises at least one backrest element and two seat elements. Each of the two seat elements is moveable relative to the at least one backrest element between a folded position and an unfolded position.

The starting position may also be referred to as start position or initial position. The end position may also be referred to as operating position. As the cabin attendant seat comprises two seat elements, it may also be referred to as a double cabin attendant seat. The two seat elements may be arranged to provide seating for two cabin attendants in a back to back alignment.

In the folded position, a seat surface of each of the two seat elements may extend substantially parallel to a backrest surface of the at least one backrest element. In the unfolded position, the seat surface of each of the two seat elements may extend substantially perpendicular to the backrest surface of the at least one backrest element.

In the unfolded position, a backrest surface of the at least one backrest element may extend at an angle of approximately 80 to 100° relative to a seat surface of each of the seat elements. For example, the backrest surface of the at least one backrest element may extend at an angle of approximately 90° relative to the seat surface of each of the seat elements, when in the unfolded position. In the folded position, the backrest surface of the at least one backrest element may face the seat surface of each of the seat elements.

When one the seat elements is in its unfolded position, the cabin attendant seat may be used like a conventional cabin attendant seat by a crew member, e.g., during taxi, take-off, landing and in-flight turbulence. When both of the seat elements are in their unfolded positions, the cabin attendant seat may be used by as two conventional cabin attendant seats by crew members, e.g., during taxi, take-off, landing and in-flight turbulence.

The cabin attendant seat may be any kind of swivel type cabin attendant seat or sliding type cabin attendant seat, which is moveable from the starting position in the at least one end position. In case of a swivel type (swivel) cabin attendant seat, the cabin attendant seat may be pivotably mounted to an aircraft monument such that the cabin attendant seat may be pivoted relative to the aircraft monument from a stored position (starting position) into an operating position (end position). In case of a sliding type (sliding) cabin attendant seat, the cabin attendant seat may be slideable from a starting position into the at least one end position.

In case the cabin attendant seat is constructed as a rotatable (swivel) cabin attendant seat, the at least one backrest element, together with the seat element(s), may be rotatable about an axis of rotation which may extend in a vertical direction when the cabin attendant seat is mounted in an aircraft cabin. By rotation of the cabin attendant seat about the rotation axis, the cabin attendant seat can be moved between a rest position and an operating position. When the cabin attendant seat is located in the rest position thereof, the front side of one the at least one backrest element may face away from the inner space of the aircraft cabin. However, a rear side of the one of the at least one backrest element may face towards the inner space of the aircraft cabin. When the cabin attendant seat is located in the operating position thereof, however, the front side and the rear side of the one of the at least one backrest element may be accessible from the inner space of the aircraft cabin so that the seat elements can be folded down and the cabin attendant seat can be used. It is conceivable that the cabin attendant seat may be rotatable through an angle of approximately 90° about the axis of rotation.

In case of a sliding cabin attendant seat, the cabin attendant seat may comprise a guiding device along which the cabin attendant seat can be moved from the starting position into the at least one end position. For example, the guiding device may comprise a rail system. The rail system may comprise two or more rails. The cabin attendant seat may be moved from the starting position into the at least one end position in a sliding direction which may be transverse to the longitudinal axis of the at least one backrest element. For example, the cabin attendant seat may be moveable from the starting position into the at least one end position in a sliding direction which is perpendicular to the longitudinal axis of the at least one backrest element and perpendicular to the longitudinal axis of the aircraft (perpendicular to the flight direction of the aircraft). Alternatively, the cabin attendant seat may be moveable from the starting position into the at least one end position in a sliding direction which forms an angle with a straight line which is perpendicular to the longitudinal axis of the at least one backrest element and perpendicular to the longitudinal axis of the aircraft. The angle may be a sharp angle between 10 and 45 degrees.

The rail system may comprise or be configured as a linear guiding or a telescopic guiding.

Independent of the exact configuration of the cabin attendant seat, the two seat elements may be directed into an opposite direction in the unfolded position. For example, in case of both seat elements using the same backrest element, one of the two seat elements may be directed into the direction into which one side of the backrest element points and the other of the two seat elements may be directed into the direction into which the other side of the backrest element points. It is also conceivable that the cabin attendant seat comprises two backrest elements, each of the two backrest elements being associated, respectively, with one of the two seat elements. In this case, when the two seat elements are in the unfolded position, one of the two seat elements may be directed into the direction in which a front surface of the associated backrest element, i.e., a first of the two backrest elements, points and the other one of the two seat elements may be directed into the direction into which the associated backrest element, i.e., a second of the two backrest elements, points. In other words, one of the two seat elements may be directed into the flight direction of the aircraft and the other of the two seat elements may be directed into the opposite direction, i.e., against the flight direction of the aircraft.

The cabin attendant seat may further comprise a locking mechanism for locking the cabin attendant seat in the at least one end position, when at least one of the two seat elements is in the unfolded position. In other words, the locking mechanism may already be activated when one of the two seat elements is in the unfolded position to hold the cabin attendant seat in the at least one end position. Alternatively, the locking mechanism may be activated when both of the two seat elements are in the unfolded position. When the previously unfolded one of the two seat elements or both of the two seat elements are brought into the folded position, the locking mechanism may be unlocked to allow the cabin attendant seat to go back into the starting position. In other words, the locking mechanism may be configured to be unlocked and thereby allowing the cabin attendant seat to go back into the starting position, when both of the two seat elements are in the folded position.

The two seat elements may be arranged at the same frame of the cabin attendant seat. The two seat elements may be configured to be brought into the unfolded position together, e.g., by moving only one of the seat elements, or independent from each other. The cabin attendant seat may be fixed at an aircraft monument via the frame.

According to a second aspect, an aircraft monument comprising a wall and a cabin attendant seat as described herein is provided. The cabin attendant seat is attached to the wall of the aircraft monument.

The aircraft monument may be galley, a toilet module, a partition wall or another aircraft monument which is typically installed in the aircraft cabin. The cabin attendant seat thus may be installed close to a main aisle of an aircraft cabin in a single aisle aircraft or close to one of the aisles in a twin aisle aircraft which increases visibility of the aisle and passenger seats. As the cabin attendant seat comprises two seat elements, the cabin attendant seat may provide direct view of almost the entire cabin.

According to a third aspect, an aircraft comprising the aircraft monument as described herein is provided.

BRIEF DESCRIPTION OF THE DRAWINGS

Specific embodiments are now described in more detail with reference to the appended schematic drawings, in which.

DETAILED DESCRIPTION OF THE PREFERRED EMBODIMENTS

Although in the following, the cabin attendant seat is described with reference to a sliding cabin attendant seat and a swivel cabin attendant seat as two possible examples, the skilled person will understand that the present disclosure may be applied also to other cabin attendant seats which are moveable from a starting position to an end position.

Figure 1A:
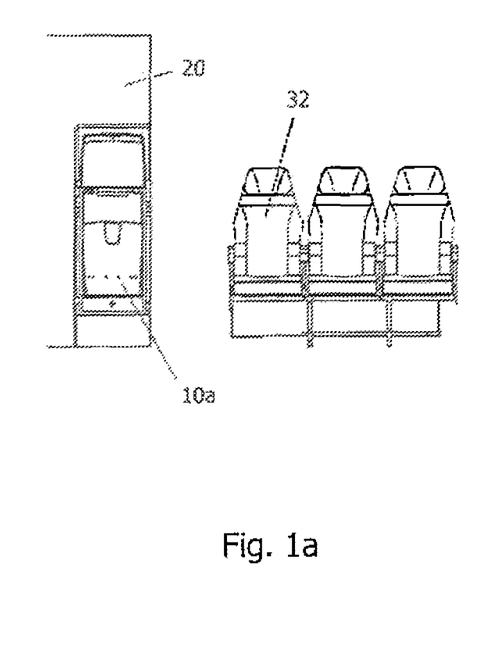
FIG. 1a schematically illustrates a cabin attendant seat according to a first embodiment in the starting position.
Figure 1B:
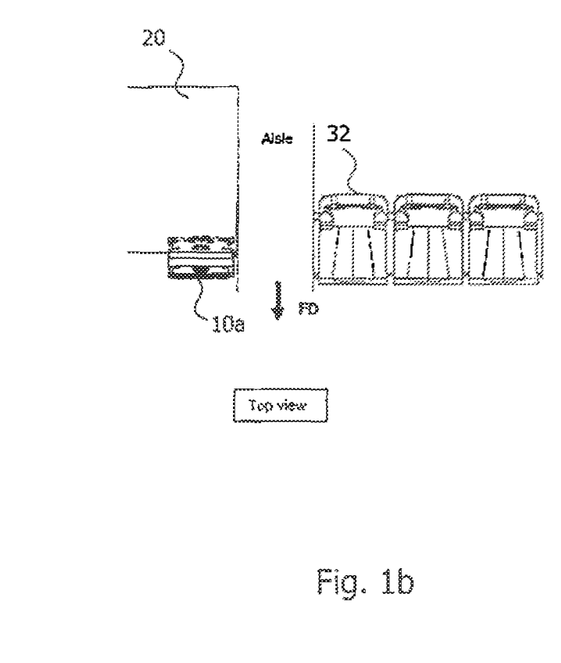
FIG. 1b schematically illustrates the cabin attendant seat of FIG. 1a in a top view.

FIG. 1a shows a cabin attendant seat according to a first embodiment. In accordance with the first embodiment, the cabin attendant seat 10a is configured as a sliding cabin attendant seat 10a. The sliding cabin attendant seat 10a is arranged at a wall of an aircraft monument 20. The aircraft monument 20 may be arranged at any position in the aircraft. For example, the aircraft monument 20 is arranged in the aircraft such that a seat row is positioned in front of the aircraft monument with the back of the seat row facing the front of the aircraft monument 20. In FIG. 1a, the sliding cabin attendant seat 10a may be arranged in the recess between the seat row and the aircraft monument 20. FIG. 1b shows the same configuration as FIG. 1a, but from a top view.

Figure 1C:
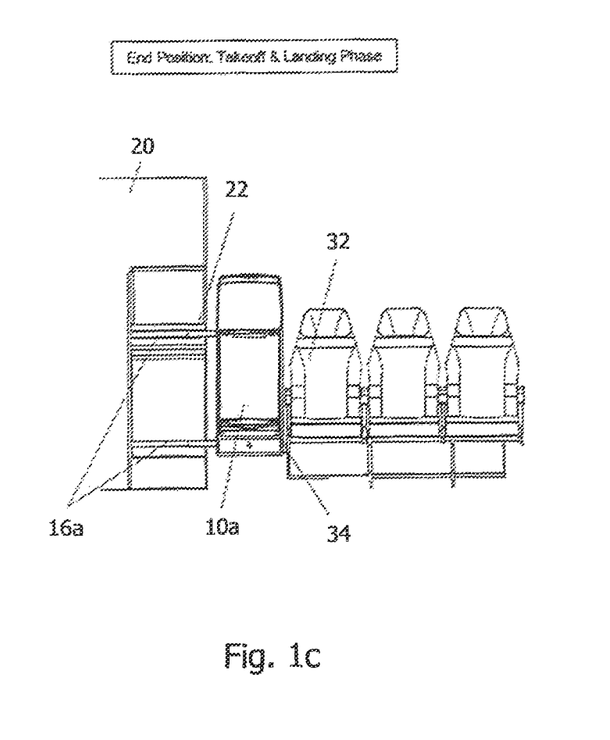
FIG. 1c schematically illustrates the cabin attendant seat of FIG. 1a in its end position.
Figure 1D:
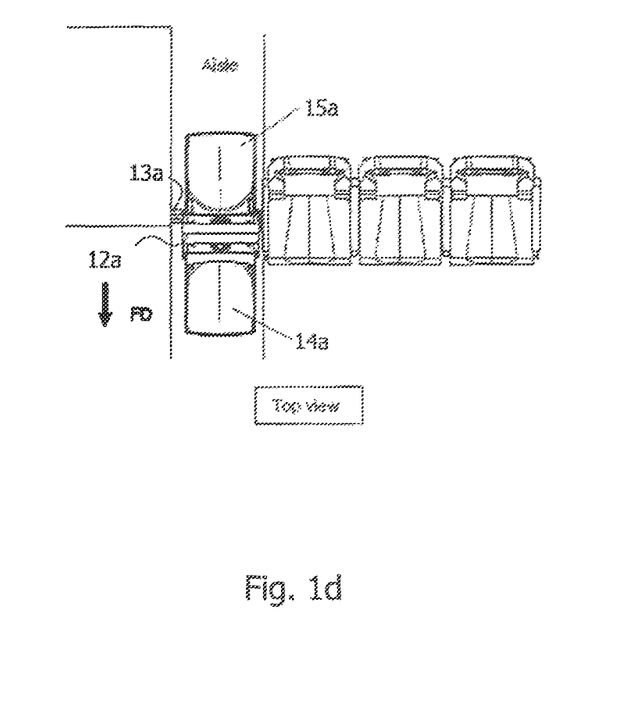
FIG. 1d schematically illustrates the cabin attendant seat of FIG. 1c in a top view.

FIGS. 1c and 1d show the sliding cabin attendant seat 10a in its end position. As can be seen from FIG. 1c, the sliding cabin attendant seat 10a comprises a rail system 16a along which the sliding cabin attendant seat 10a can be moved from the starting position of FIGS. 1a and 1b into the end position shown in FIGS. 1c and 1d. For connecting the rail system 16a to the aircraft monument 20, a rack system 22 is provided at the aircraft monument 20. As can be seen from FIGS. 1c and 1d, in the end position, the sliding cabin attendant seat 10a is positioned in the area of an aisle which lies between the aircraft monument 20 and an aircraft seat 32. Rather schematically, a connection 34 between the sliding cabin attendant seat 10a and a seat 32 which is arranged next to the aircraft monument 20 is shown. The connection 34 may be any kind of form fit connection between the sliding cabin attendant seat 10a and the seat 32. The connection 34 allows the sliding cabin attendant seat to not only be supported by the aircraft monument 10 (by means of the arrangement at the aircraft monument 10), but also by the seat 32 by means of the connection 34 between the sliding cabin attendant seat 10a and the seat 32. The connection 34 may be formed by an element protruding from the sliding cabin attendant seat 10 into a recess in the seat 32, e.g., a seat brace.

The sliding cabin attendant seat 10a comprises two backrest elements 12a, 13a and two seat elements 14a, 15a. Alternatively, it is conceivable that the sliding cabin attendant seat comprises only one backrest element having two surfaces respectively associated to the two seat elements 14a, 15a to form two seats. In the example shown in FIGS. 1c and 1d, the backrest element 12a and the seat element 14a form a seat which is directed in the flight direction FD of the aircraft and is therefore named forward cabin attendant seat (of the sliding cabin attendant seat 10a) or in short forward seat in the following. The backrest element 13a and the seat element 15a form a seat which is directed in the opposite direction of the flight direction FD and is therefore named aft cabin attendant seat (of the sliding cabin attendant seat 10a) or in short aft seat in the following.

Figure 2A:
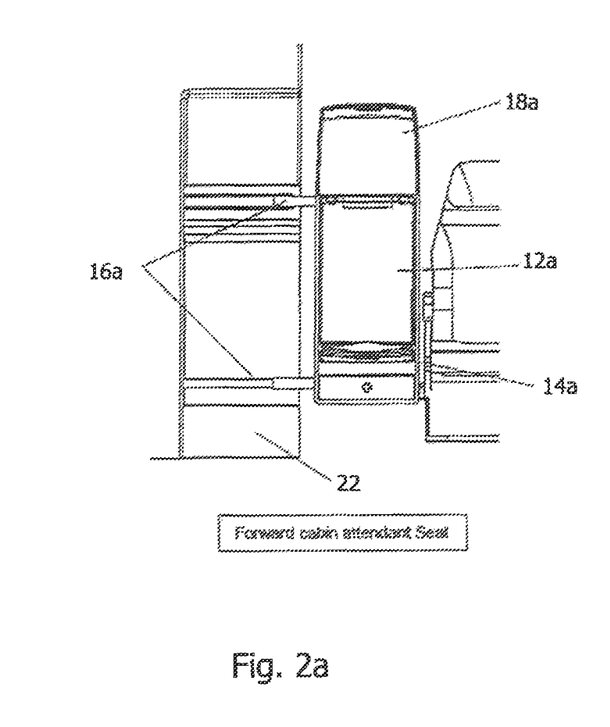
FIG. 2a schematically illustrates the front view of the cabin attendant seat of FIG. 1c.
Figure 2B:
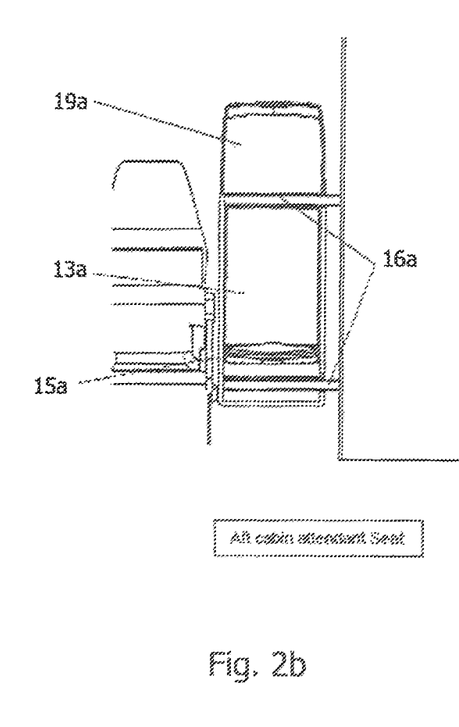
FIG. 2b schematically illustrates the back view of the cabin attendant seat of FIG. 1c.

The forward cabin attendant seat is further illustrated in FIG. 2a and the aft cabin attendant seat is further illustrated in FIG. 2b. As can be seen in FIG. 2a, the forward cabin attendant seat comprises the (forward) backrest element 12a, the (forward) seat element 14a and a (forward) headrest element 18a. Likewise, the aft cabin attendant seat comprises the (aft) backrest element 13a, the (aft) seat element 15a and a(n) (aft) headrest element 19a. Both the forward cabin attendant seat and the aft cabin attendant seat are connected via the same rail system 16a to the rack system 22 of the aircraft monument 20.

Figure 2C:
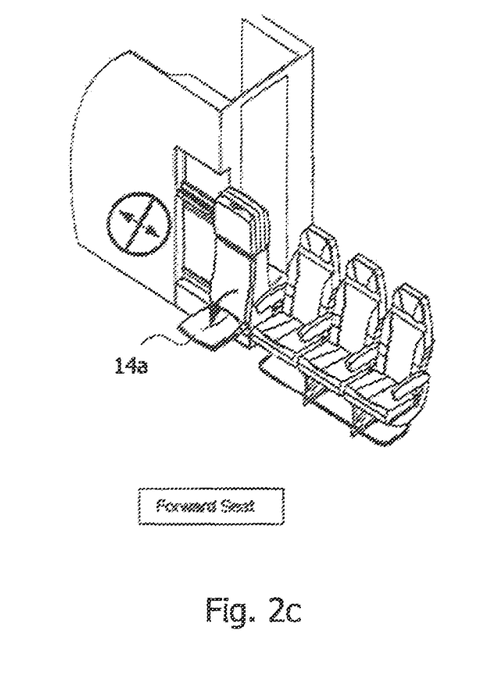
FIG. 2c shows another perspective of the front view of the cabin attendant seat.
Figure 2D:
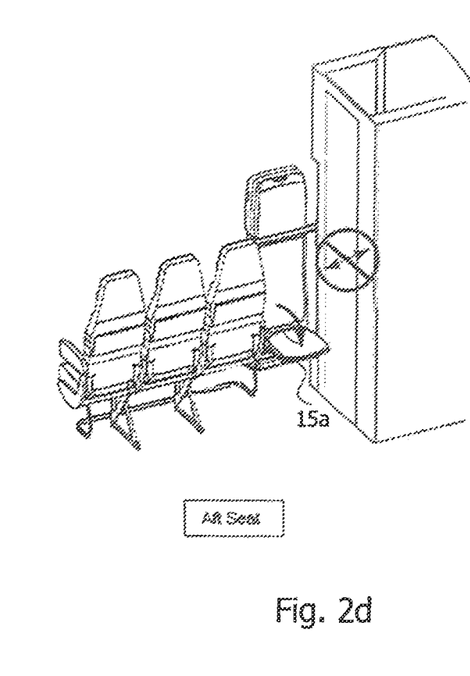
FIG. 2d shows another perspective of the back view of the cabin attendant seat.

FIGS. 2c and 2d schematically illustrate the operation of a locking mechanism which may be provided in the sliding cabin attendant seat 10a. The locking mechanism, when activated, prevents that the sliding cabin attendant seat 10a goes back into the starting position from the end position, when at least one of the seat elements 14a, 15a is in the unfolded position. According to one possible realization of the locking mechanism, the locking mechanism may already be activated when one of said seat elements 14a, 15a is in the unfolded position, i.e., when either the forward seat element 14a or the aft seat element 15a or both the forward seat element 14a and the aft seat element 15a are brought into the unfolded position. According to a second possible realization, the locking mechanism may be activated when both the forward seat element 14a and the aft seat element 15a are brought into the unfolded position.

FIGS. 3a to 3d show a second embodiment of a cabin attendant seat. According to the second embodiment, the cabin attendant seat is configured as a swivel cabin attendant seat 10b. However, all of the general explanations set forth above with respect to the first embodiment which are not specific to the sliding mechanism of the sliding cabin attendant seat 10a equally apply also to the swivel cabin attendant seat 10b according to the second embodiment.

The swivel cabin attendant seat 10b comprises a forward seat comprising a forward backrest element 12b, a forward seat element 14b and a forward headrest element 18b. Further, the swivel cabin attendant seat 10b comprises an aft seat comprising an aft backrest element 13b, an aft seat element 15b and an aft headrest element 19b. In an end position, explained below, the forward seat is directed into the flight direction FD of the aircraft and the aft seat is directed into the opposite direction.

Figure 3A:
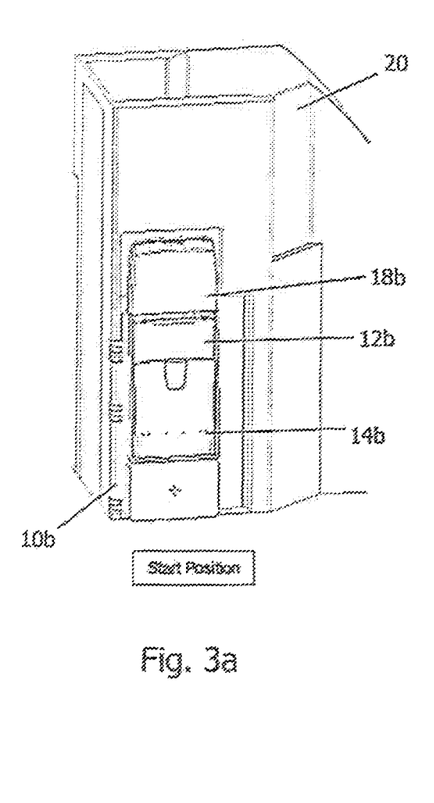
FIG. 3a schematically illustrates a cabin attendant seat according to a second embodiment in the starting position.
Figure 3B:
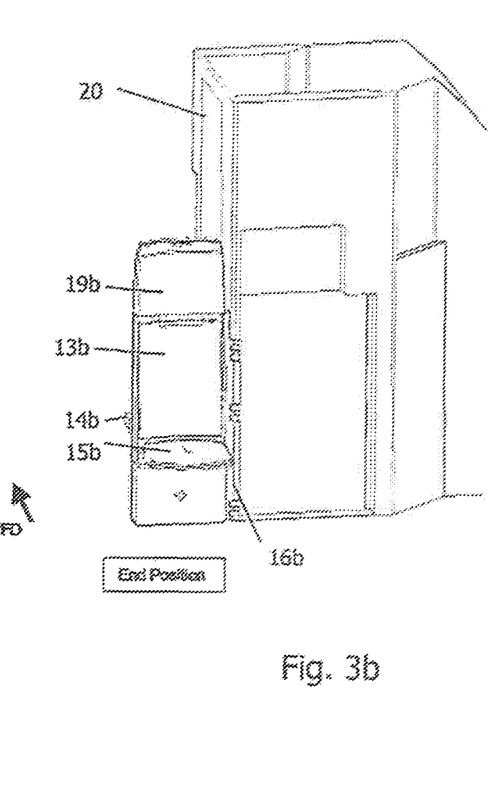
FIG. 3b schematically illustrates the cabin attendant seat of FIG. 3a in its end position.

As can be further seen from FIGS. 3a and 3b, the swivel cabin attendant seat 10b can be pivoted from a start position shown in FIG. 3a into the end position shown in FIG. 3b around a pivoting mechanism 16b. The pivoting mechanism 16b allows the swivel cabin attendant seat 10b to be pivoted with respect to the aircraft monument 20 around an axis of rotation. The axis of rotation is perpendicular to the flight direction FD and arranged in a vertical direction in the aircraft.

Figure 3C:
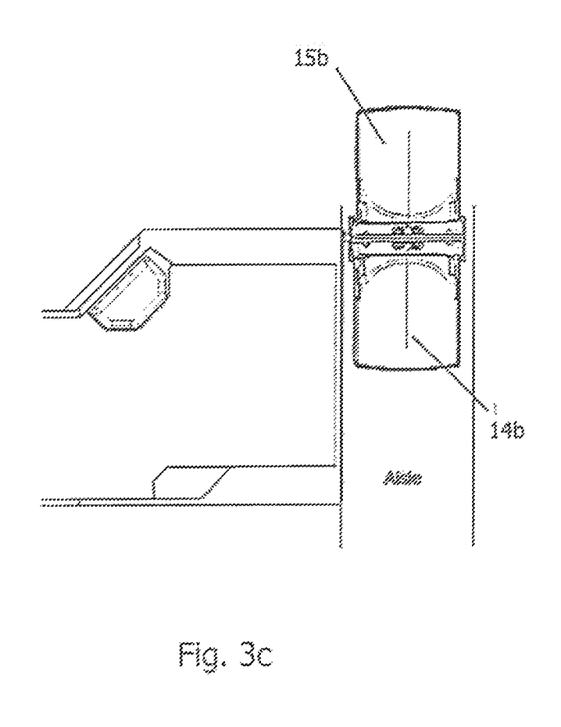
FIG. 3c schematically illustrates the cabin attendant seat of FIG. 3b from a top view.
Figure 3D:
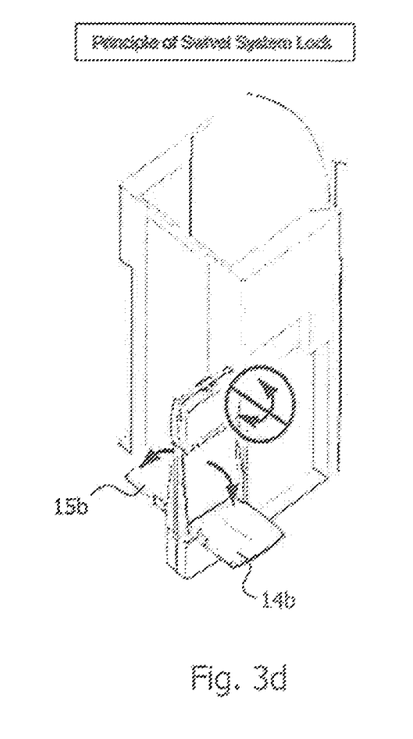
FIG. 3d shows another perspective of the cabin attendant seat of FIG. 3c.

FIG. 3c shows a top view of the swivel cabin attendant seat 10b in its end position. Further, the forward seat element 14b and the aft seat element 15b are respectively in its unfolded position. As schematically illustrated in FIG. 3d, when the seat elements 14b, 15b are in their unfolded position, the swivel type cabin attendant seat 10b is prevented from going back from its end position into its starting position. As explained above with respect to the sliding cabin attendant seat 10a, the locking mechanism may be activated when at least one of said seat elements 14b, 15b is in its unfolded position or may be activated when both seat elements 14b, 15b are in the unfolded position.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A cabin attendant seat for an aircraft, the cabin attendant seat being movable from a starting position into at least one end position, the cabin attendant seat comprising:
   at least one backrest element;
   two seat elements, each of the two seat elements being movable relative to the at least one backrest element between a folded position and an unfolded position, independent of the starting position and end position of the cabin attendant seat; and a connection element protruding from the cabin attendant seat and configured to connect the cabin attendant seat with an aircraft seat arranged next to the cabin attendant seat when the cabin attendant seat is in the end position.

2. The cabin attendant seat according to claim 1, wherein, in the folded position, a seat surface of each of the two seat elements extends substantially parallel to a backrest surface of the at least one backrest element, and in the unfolded position, the seat surface of each of the two seat elements extends substantially perpendicular to the backrest surface of the at least one backrest element.

3. The cabin attendant seat according to claim 1, wherein, in the unfolded position, the two seat elements are directed into an opposite direction.

4. The cabin attendant seat according to claim 1, wherein the at least one backrest element of the cabin attendant seat comprises two backrest elements, each of the two backrest elements being associated with one of the two seat elements.

5. The cabin attendant seat according to claim 1, wherein the cabin attendant seat comprises a locking mechanism for locking the cabin attendant seat in the at least one end position, when at least one of the two seat elements is in the unfolded position.

6. The cabin attendant seat according to claim 1, wherein both of the two seat elements are arranged at the same frame of the cabin attendant seat.

7. The cabin attendant seat according to claim 1, wherein the cabin attendant seat is configured as a swivel cabin attendant seat or sliding cabin attendant seat.

8. The cabin attendant seat of claim 7, wherein the cabin attendant seat is configured as a sliding cabin attendant seat, the sliding cabin attendant seat comprises a guiding device, the guiding device being configured to support the sliding cabin attendant seat in the starting position and being configured to allow the sliding cabin attendant seat to be moveable transverse to the longitudinal axis of the at least one backrest element from the starting position into the at least one end position.

9. The cabin attendant seat of claim 7, wherein the cabin attendant seat is configured as a swivel cabin attendant seat, and the swivel cabin attendant seat comprises a pivoting mechanism allowing the cabin attendant seat, upon being moved between its starting position and its end position, to be pivoted.

10. An aircraft monument comprising,
a wall; and
a cabin attendant seat attached to the wall of the aircraft monument and being movable from a starting position into at least one end position, comprising:
at least one backrest element;
two seat elements, each of the two seat elements being movable relative to the at least one backrest element between a folded position and an unfolded position independent of the starting position and end position of the cabin attendant seat; and
a connection element protruding from the cabin attendant seat and configured to connect the cabin attendant seat with an aircraft seat arranged next to the cabin attendant seat when the cabin attendant seat is in the end position.

11. An aircraft comprising an aircraft monument, comprising,
a wall; and
a cabin attendant seat attached to the wall of the aircraft monument and being movable from a starting position into at least one end position, comprising:
at least one backrest element;
two seat elements, each of the two seat elements being movable relative to the at least one backrest element between a folded position and an unfolded position, independent of the starting position and end position of the cabin attendant seat; and
a connection element protruding from the cabin attendant seat and configured for connecting the cabin attendant seat with an aircraft seat arranged next to the cabin attendant seat when the cabin attendant seat is in the end position.

* * * * *